(12) United States Patent
Neuman et al.

(10) Patent No.: US 8,254,760 B2
(45) Date of Patent: Aug. 28, 2012

(54) PIXEL ANALYSIS AND FRAME ALIGNMENT FOR BACKGROUND FRAMES

(75) Inventors: Michael Neuman, San Francisco, CA (US); G. Garrett Groszko, Oakland, CA (US)

(73) Assignee: Apple Inc., Cupertino, CA (US)

( * ) Notice: Subject to any disclaimer, the term of this patent is extended or adjusted under 35 U.S.C. 154(b) by 474 days.

(21) Appl. No.: 12/550,298

(22) Filed: Aug. 28, 2009

(65) Prior Publication Data

US 2011/0051991 A1  Mar. 3, 2011

(51) Int. Cl.
*H04N 5/93* (2006.01)
(52) U.S. Cl. .................................... 386/278; 386/280
(58) Field of Classification Search ............ 386/278, 386/280, 286, 210, 224, 230, 242
See application file for complete search history.

(56) References Cited

U.S. PATENT DOCUMENTS

| | | | |
|---|---|---|---|
| 6,215,516 B1 | 4/2001 | Ma et al. | |
| 6,466,205 B2 | 10/2002 | Simpson et al. | |
| 6,630,931 B1 | 10/2003 | Trika et al. | |
| 6,927,769 B2 | 8/2005 | Roche, Jr. | |
| 2006/0114539 A1* | 6/2006 | Childers | 359/196 |
| 2007/0279415 A1 | 12/2007 | Sullivan et al. | |
| 2008/0094479 A1* | 4/2008 | Yost et al. | 348/208.99 |
| 2008/0303894 A1 | 12/2008 | Ernst et al. | |
| 2009/0116732 A1 | 5/2009 | Zhou et al. | |

OTHER PUBLICATIONS

Bruce D. Lucas and Takeo Kanade, "An Iterative Image Registration Technique with an Application to Stereo Vision," Proceedings of the 7th International Joint Conference on Artificial Intelligence (IJCAI) 1981, Aug. 24-28, Vancouver, British Columbia, pp. 674-679.

* cited by examiner

*Primary Examiner* — Robert Chevalier
(74) *Attorney, Agent, or Firm* — Novak Druce + Quigg LLP

(57) ABSTRACT

Background frames can be completed from a collection of frames having foreground objects that are partially obscuring the pixels comprising the background. The special offset of a pixel represented across a collection of frames can be determined based on camera movement data. By determining the relative offset of a pixel represented in a first frame from the same pixel in other frames, pixel values representing a background object can be accumulated to derive a completed background frame.

10 Claims, 8 Drawing Sheets

PIXEL ANALYSIS AND FRAME ALIGNMENT FOR BACKGROUND FRAMES

TECHNICAL FIELD

Techniques of video editing are disclosed, specifically, techniques for completing a background frame from a collection of pictures or frames are disclosed.

INTRODUCTION

Over the last decade significant advances have been made in video object manipulation and analysis. Special effects in movie and picture editing and even film generation have been just some of the fields that have benefited from these advancements. Even techniques developed for artificial intelligence and machine vision have been borrowed to enhance video object manipulation and analysis. However, even with these advancements video editing is still limited by a two dimensional workspace that often limits the data that can be captured.

One such example is in working with objects that wholly or partially obscure the background of a picture or video frame. Due to the limitations of a two-dimensional workspace, no pixel data representing that background can be recorded. While this problem is typically solved during the creation of the original video by filming an entire background frame without any foreground action, this technique is not available to after-the-fact editing or manipulation. Accordingly, a method for completing a background frame from picture or video frames is needed.

Currently technology attempts to blend blank pixels with the rest of the background, or repeat pixels from elsewhere in the same frame, but these techniques have obvious flaws in that they are often noticeable and not of sufficient quality. Accordingly, a more advanced method for completing a background frame that overcomes the limitations in the art is needed.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for completing a background plate or a background frame from a collection of frames wherein a foreground object at least partially obscures the background. The method comprises selecting a first frame and one or more second frames from a collection of frames for analysis. By analyzing the collection of frames, data from pixels that represent a portion of the background can be collected and combined into a complete background frame.

In order to track pixels across frames, (and identify the correct pixels values to complete the background) the spatial offset between the pixels representing the first and second frames to be analyzed is determined. The spatial offset is determined by analyzing frames to identify at least two clusters of pixels having little inter-frame change and determining the relative movement of at least one cluster of pixels against at least one other cluster of pixels. From this data, the pixels of the second frame can be located from the positions of the pixels making up the first frame. In some embodiments the frames themselves can be aligned so that the pixels representing a first frame will directly map to the pixels representing a second frame.

Pixels making up the frames are analyzed to determine their pixel values. The respective pixel values for each of the pixels are analyzed across the frames and the predominant pixels values are retained to complete the background frame.

In some embodiments, foreground and background objects can be identified and this information can be used to determine which pixel values to retain for completion of the background. Foreground and background objects can be identified by calculating vectors for a plurality of pixels represented in the first frame and the one or more second frames. The vector represents the respective distance a pixel has moved from one frame to the next due to a change in camera position. Based on the magnitude of the vector, foreground and background objects can be distinguished. Objects comprised of pixels having greater vectors can be identified as foreground objects and objects comprised of pixels having lesser vectors can be identified as background objects.

In some embodiments a pixel map of an object that appears in at least two frames of a video but is partially obscured in each frame by a foreground object can be completed by calculating an offset between pixels of different frames and recording pixel values for pixels unobscured by the foreground object from each frame, and completing the object by retaining pixel values that are not representative of the foreground object.

In some embodiments it is further useful to detect edges of the foreground object, and discard all pixel values contained within an outline of the foreground object comprised by the edges of the foreground object.

Also disclosed are devices for carrying out the above method. Similarly, the described embodiments can all be recorded on a computer-readable medium having computer readable instructions stored thereon and useful for instructing various processor-based devices for carrying out the methods described herein.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
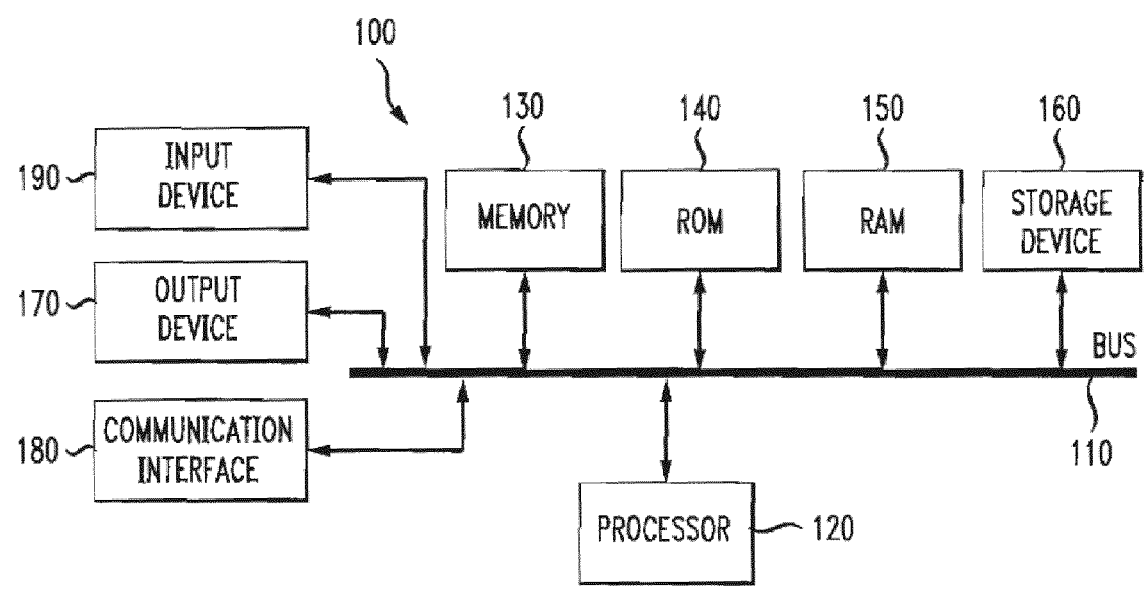
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
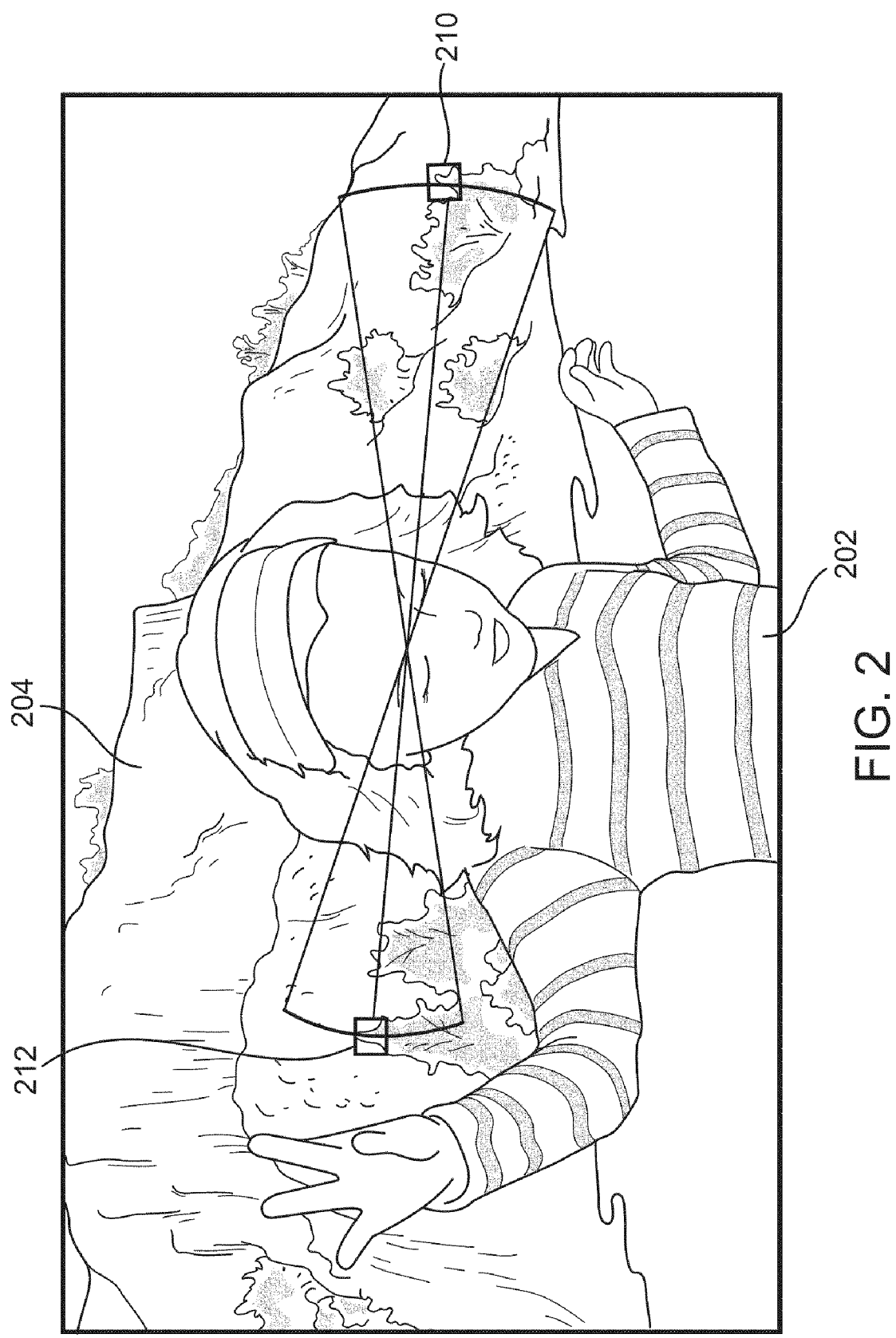
FIG. 2 illustrates an example frame having a partially obscured background and a camera movement analysis embodiment.

The present system and method is particularly useful for separating out objects within a video or picture frame using information from at least one other video or picture frame. See for example, FIG. 2, which illustrates a photograph of a girl 202 in front of a mountain 204. Using the present system and method, it is possible to complete the obscured portions of the mountain 204 to create a more complete background frame. Furthermore, the present system and method can separate the girl 202, from the background 204 and move the foreground image independently of the background.

Figure 3:
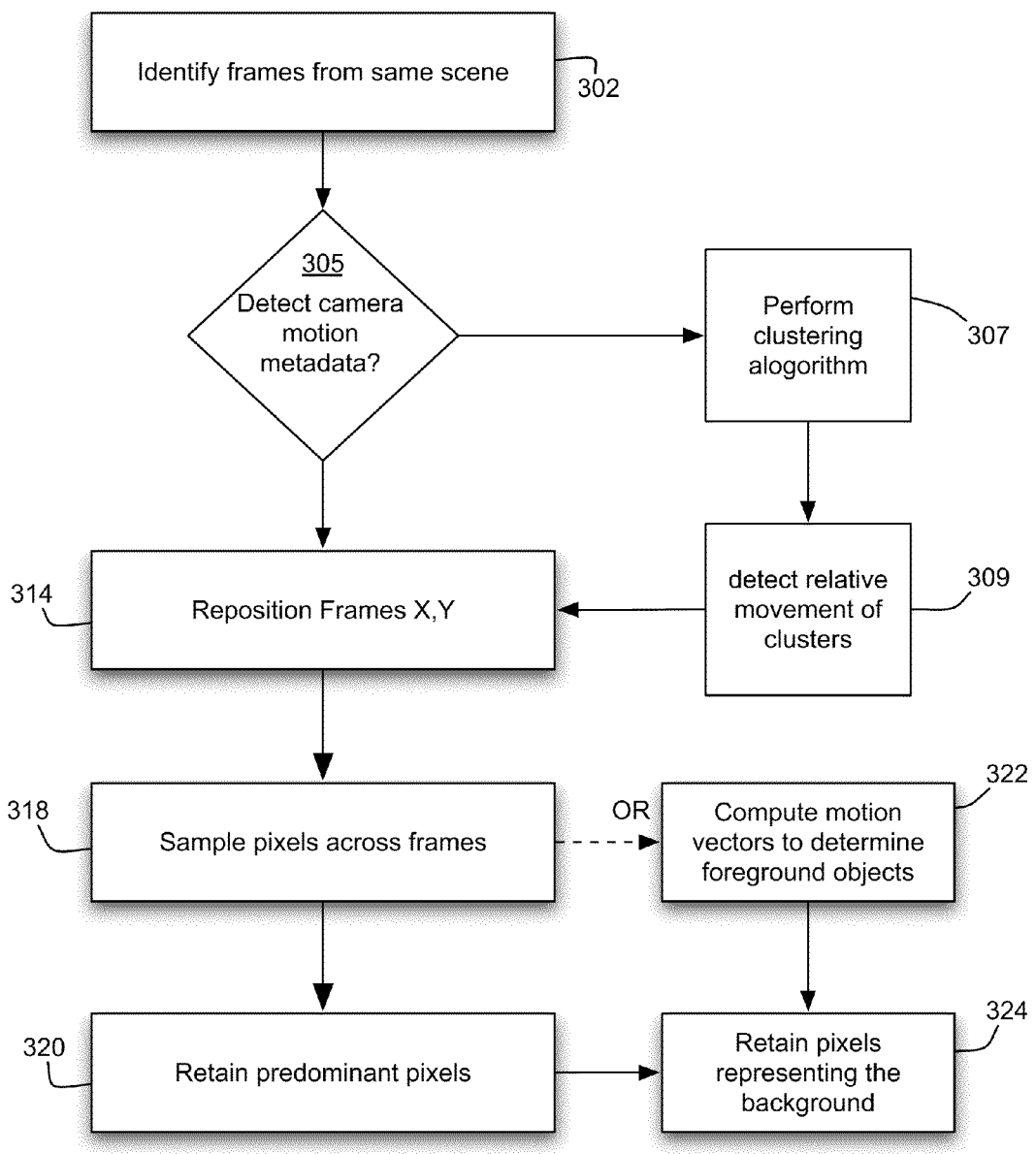
FIG. 3 illustrates a method embodiment for completing a background frame.

The process fills in the obscured pixels of background objects, as shown in FIG. 3. The process identifies other frames from the same scene as a target frame that can be analyzed to borrow pixels needed to fill in obscured areas 302. From a group of candidate frames (FIGS. 2, 4, 5, for example), the process can compare a target frame to at least one other frame. While one other frame might be sufficient to complete the background frame, according to the method described herein, larger groups of candidate frames increase the likelihood that the needed pixels can be discovered.

For all frames to be compared, the process must determine the relative motion of the camera used to take the photograph or record the video. If the image was recorded using a digital camera, metadata may be available pertaining to the frame positioning corrective data associated with an algorithm for that purpose, for example, anti-shake technology 305. If there is no camera metadata, the relative movement of camera between frames can be determined by comparing the motion of one group of pixels to another group of pixels across the frames to be analyzed. For example, see FIG. 2 wherein groupings of pixels 210 can be compared with groupings of pixels 212 across multiple frames. Based on the movement of pixels 212 relative to pixels 210, camera motion (in the x,y plane) between the two pixels can be determined. Motion in the z-plane can be determined by comparing the pixel density of background imagery to the pixel density of foreground imagery. In some embodiments camera motion can be analyzed using metadata from the camera itself.

Where the relative motion of pixel clusters is required to determine camera movement, the process can select clusters of pixels to use in the analysis. The process can analyze across the group of candidate frames for pixel areas that have little inter-frame change. In some embodiments, clustering algorithms can be used to identify common clusters of pixels across the group of candidate frames 307. The clusters can be of any number of pixels sufficient to easily track across the candidate frames, however in at least some embodiments, it is preferred that the clusters of pixels be at least 10×10 pixels, 13×13 pixels, or 20×20 pixels. In some embodiments, the process selects pixels near the outer portions of the respective frames having good contrast to the surrounding areas. In some embodiments, pixels making up an object of focus can also be used to determine the relative motion of the camera from one frame to the next. In some embodiments, a greater number of points can be selected, or multiple techniques can be combined.

If however, any of the pixels clusters become obscured or out of frame in any of the candidate frames, the process can repeat the motion analysis by selecting new groups of pixels. The new groups of pixels do not necessarily need to be represented in every frame, but at a minimum, the groups of pixels must be able to determine the motion of the camera relative to the camera's motion in another already analyzed frame.

In some embodiments, once the camera motion has been detected, the frames that are to be analyzed need to be repositioned in the x, y planes to eliminate the camera motion 314. This process serves to effectively make it so that if any two frames were to be overlaid upon each other, the pixels in the frames would align. Because of this relationship, it is possible to accurately identify and track pixels across multiple frames. In some embodiments, the frame repositioning does not require a physical repositioning. Using the data corresponding to the camera motion across the frames, the method calculates a spatial offset corresponding to the offsetting location of a pixel in one frame compared to the location of the same pixel in another frame. Using this technique the method can identify pixels across frames that represent the same portion of the background object.

Each pixel is identified across the frames to be analyzed and the pixel values for each pixel are sampled 318. In the simplest embodiments, pixels can be tracked because they directly correspond to each other from frame to frame after repositioning the frames 314. However, several techniques are known in the art for tracking a pixel's movement within a frame. For example, the process can look for similar pixels within a range of 20×20 pixels from the original position of a target pixel. Additionally, the process can take in account possible camera motion in the z-plane and detect pixels that are now merged or divided into several separate pixels due to zoom, or z-plane camera movement 309.

In sampling for any given pixel in any given frame, a value is obtained. For example, for a pixel 30,30 it may have values 0, 200, 20 (RBG) in the first sample frame, and values 0, 202, 19 in a second frame and values 200, 100, 25 in a final frame. The values in the first two frames are nearly identical and indicate that the particular analyzed pixel is representing the same object in the first two frames. While the pixel values differ slightly, they still likely represent the same portion of the image in each of the frames and the difference in values can be attributed to lighting, exposure or other minor variations. However, the values for the same pixel in the third frame differ enough that the pixel is likely representing a different object.

In some embodiments, the method can accommodate variations in pixel values of up to 15% and still identify them as representing the same object. Pixel values having a greater variation run the risk of representing a different object in the frame and these variations are outside the range of likely inter-frame variation for the same object.

Analyzing the range of values for each pixel, the process maintains the most predominant values 320 and assumes that this value is the value of the background object. This assumption is made because a background object is likely to remain more consistent and is less likely to move about the frame, as would the object of focus.

Figure 4:
FIG. 4 illustrates a frame repositioned relative to a first frame.
Figure 5:
FIG. 5 illustrates a background frame object temporarily obscured.

This is best illustrated with reference to FIGS. 4 and 5. In FIG. 5, the girl's hand obscures a bush in the background (see view box 220). For this frame, a value would be a sample that is different than the value sampled in FIG. 4 or FIG. 2, which are not obscured by the girl's hand. Thus, in this example, by maintaining the most predominant value, the process will correctly choose pixel values for the background image and, over the course of several frames, will complete a background frame.

Figure 6:
FIG. 6 illustrates a background frame completion embodiment.
Figure 7:
FIG. 7 illustrates a completed background frame.

FIG. 6 illustrates the effect of maintaining the predominant pixels. In this figure, half of the girl has been replaced with pixel values of the background. This figure illustrates the application of the process explained above. Across the frames selected for analysis by this method, the process was able to identify predominant (and consistent) values for the filled in area because in the other frames analyzed to develop this figure the girl had moved and exposed the background. FIG. 7 illustrates the same frame after the process has analyzed additional frames and has extracted the complete background frame. In this figure only the background remains; any pixels that had represented the girl in this frame have been replaced with pixels representing the background.

In some embodiments, additional analysis can be performed to eliminate the reliance of the aforementioned presumption that the most predominant values represent the background. For example, the process can compute pixel motion vectors to determine the relative amounts of inter-frame movement 322. Using a method similar to that described by Lucas, B. and Kanade, T., "An Iterative Image Registration Technique with an Application to Stereo Vision" Proc. 7$^{th}$ Intl Conf on Artificial Intelligence (IJCAI) 1981, Aug. 24-28, pp. 674-679, pixel vectors can be computed and based on the relative vector of a given pixel compared to others in the frame and corresponding depth values can be determined. A pixel representing a portion of a foreground object will have a greater vector than a pixel representing a portion of a background object. Using these vector values, pixels representing a background object can be ascertained and retained 324.

Taking the analysis one step further, pixel values that might only appear in one frame (thus having no vector) but representing a portion of the background can be determined by an analysis of these pixels values against the pixel values known to represent a foreground object and background object. The relative similarity of the unknown pixels to the known pixels can be used to determine whether these pixel values should be retained as a missing piece of a background.

This type of analysis can be especially useful when considering only two frames. Across two frames, any pixels that are obscured in one frame, but not in another will not have any vector values. However, other portions of the background objects and foreground objects will have been known to be or assumed to represent the background. Thus, the transient portions of the background can be compared with the values of the pixels already determined to represent the background and the pixels having the values most similar to the rest of the background are retained.

In some embodiments, it may also be useful to compare these unassociated pixels with values know to represent the foreground image as well. However, this comparison would select the pixels least likely to represent a portion of the foreground. This second layer of analysis can add an extra degree of confidence that the proper pixels are retained.

Figure 8:
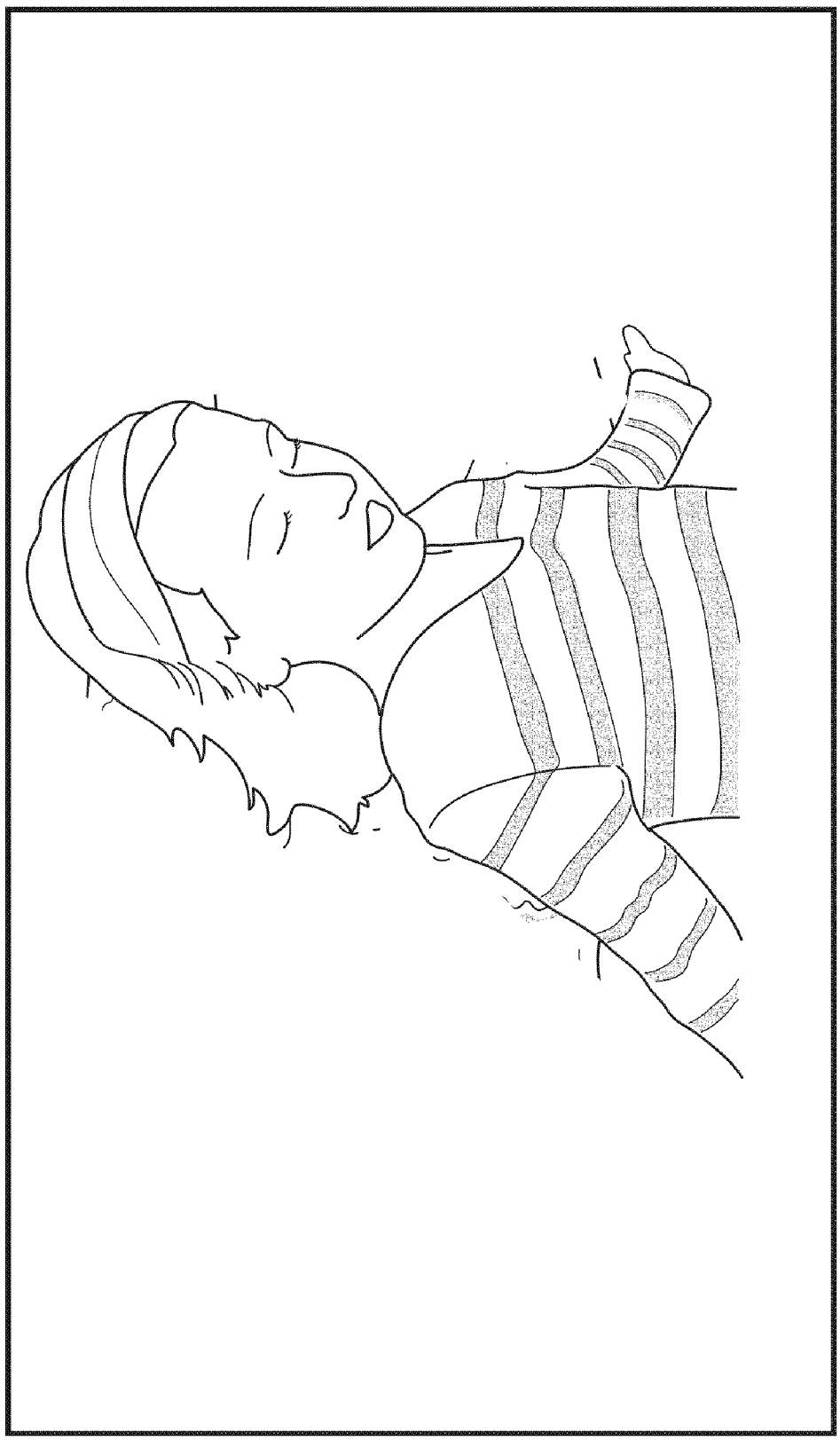
FIG. 8 illustrates an extracted foreground object.

In other embodiments, the vector analysis is further useful to extract a foreground object or reposition the foreground object. By performing a vector analysis, the pixels making up the foreground object will have the greatest vector and thus the majority of the foreground object can be identified in this manner. The rest of the object can be extracted using known edge detection algorithms to trace the edge of the foreground object. See for example FIG. 8 wherein the girl has been extracted from the background.

Having completed a background frame and extracted a foreground object, the foreground object can be manipulated and moved within the frame separately from the background.

It will be appreciated that across the various embodiments it is possible that the entire background frame will not be completed if the foreground object continues to obscure the background. In such cases, no pixel values for the background can be identified and incorporated into the background frame. Such eventuality becomes less likely as the number of frames analyzed increases. However, in situations where pixel data representing the background image cannot be obtained, these pixels can be manufactured using less satisfactory methods known in the art.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such tangible computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the tangible or intangible computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. For example, the principles herein may be applied to an online store accessible wirelessly by a portable media playback device or by a personal computer physically connected to a network. Those skilled in the art will readily recognize various modifications and changes that may be made to the present invention without following the example embodiments and applications illustrated and described herein, and without departing from the true spirit and scope of the present disclosure.

The invention claimed is:

1. A method for completing a background frame from two or more frames in a collection comprising:
    selecting a first frame and one or more second frames from a collection of frames for analysis;
    determining a spatial offset between the first and second frames;
    aligning pixels of the second frames with the pixels of the first frame based on the spatial offset data;
    analyzing the pixels comprising the first and second frames; and
    maintaining predominant pixels values across the analyzed frames.

2. The method of claim 1, wherein the special offset is determined by analyzing frames to identify at least two clusters of pixels having little inter-frame change and determining the relative movement of at least one cluster of pixels against at least one other cluster of pixels.

3. The method of claim 1, further comprising:
    calculating vectors for a plurality of pixels represented in the first frame and the one or more second frames, the vector representing the respective distance a pixel has moved from one frame to the next due to a change in camera position; and
    identifying objects comprised of pixels having greater vectors as foreground objects and objects comprised of pixels having lesser vectors as background objects.

4. The method of claim 3, further comprising:
    averaging the pixel values of those pixels identified as background objects and comparing pixel values from other frames against the average;
    identifying pixels from other frames having approximately similar pixel values as also comprising background pixels; and
    maintaining these pixel values across the analyzed frames.

5. The method of claim 1, wherein the frames comprise individual photographs.

6. A non-transitory computer-readable medium storing computer executable instructions for implementing a method on a device, the instructions comprising:
- selecting a first frame and one or more second frames from a collection of frames for analysis;
- determining a spatial offset between the first and second frames;
- aligning pixels of the second frames with the pixels of the first frame based on the spatial offset data;
- analyzing the pixels comprising the first and second frames; and
- maintaining predominant pixels values across the analyzed frames.

7. The non-transitory computer-readable medium of claim 6, wherein the special offset is determined by analyzing frames to identify at least two clusters of pixels having little inter-frame change and determining the relative movement of at least one cluster of pixels against at least one other cluster of pixels.

8. The non-transitory computer-readable medium of claim 6, the instructions further comprising:
- calculating vectors for a plurality of pixels represented in the first frame and the one or more second frames, the vector representing the respective distance a pixel has moved from one frame to the next due to a change in camera position; and
- identifying objects comprised of pixels having greater vectors as foreground objects and objects comprised of pixels having lesser vectors as background objects.

9. The non-transitory computer-readable medium of claim 8, the instructions further comprising:
- averaging the pixel values of those pixels identified as background objects and comparing pixel values from other frames against the average;
- identifying pixels from other frames having approximately similar pixel values as also comprising background pixels; and
- maintaining these pixel values across the analyzed frames.

10. A device comprising:
- a video processor configured to select a first frame and one or more second frames from a collection of frames for analysis and determining a spatial offset between the first and second frames, the processor further configured for analyzing pixels comprising the first and second frames and comparing values corresponding to a pixel in a first frame with a pixel in the second frame, the pixel in the second frame being identified based on the special offset with respect to the location of the first pixel in the first frame, and configured to maintain predominant pixels values across the analyzed frames.

* * * * *